United States Patent
Du et al.

(10) Patent No.: US 12,173,700 B2
(45) Date of Patent: Dec. 24, 2024

(54) LONG-ENDURANCE SELF-POWERED OCEAN BUOY

(71) Applicant: SHANDONG UNIVERSITY OF SCIENCE AND TECHNOLOGY, Qingdao (CN)

(72) Inventors: Libin Du, Qingdao (CN); Ruichun Dong, Qingdao (CN); Jie Liu, Qingdao (CN); Mengqi Hu, Qingdao (CN); Jinghe Chen, Qingdao (CN); Yunliang Liu, Qingdao (CN); Mingchen Lei, Qingdao (CN); Shuo Wei, Qingdao (CN); Rui Zhao, Qingdao (CN); Yifan Ke, Qingdao (CN); Chen Liu, Qingdao (CN); Chengbin Ma, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/705,039

(22) PCT Filed: Oct. 8, 2022

(86) PCT No.: PCT/CN2022/123749
§ 371 (c)(1),
(2) Date: Apr. 26, 2024

(87) PCT Pub. No.: WO2023/236399
PCT Pub. Date: Dec. 14, 2023

(65) Prior Publication Data
US 2024/0328400 A1    Oct. 3, 2024

(30) Foreign Application Priority Data
Jun. 9, 2022   (CN) .......................... 202210648599.4

(51) Int. Cl.
F03B 13/20      (2006.01)
B63B 22/24      (2006.01)
F03G 7/05       (2006.01)
H02K 7/18       (2006.01)

(58) Field of Classification Search
(52) U.S. Cl.
CPC ................ F03G 7/05 (2013.01); B63B 22/24 (2013.01); H02K 7/1876 (2013.01); *F05B 2220/706* (2013.01)

(58) Field of Classification Search
CPC ........ F03B 13/26; F03B 13/16; F03B 13/188; F03B 13/1885; F03B 13/20; F03B 15/00;
(Continued)

(56) References Cited

U.S. PATENT DOCUMENTS 10,087,909 B2 * 10/2018 Sheldon-Coulson ... F03B 13/22
10,240,575 B2 *  3/2019 Dragic ................ F03B 13/1855

FOREIGN PATENT DOCUMENTS

CN    112145384 A  * 12/2020    ............... F03G 7/05
CN    213535024 U  *  6/2021    ........... B63B 22/166
CN    114394217 A     4/2022

OTHER PUBLICATIONS

English Translation CN-213535024-U (Year: 2020).*
(Continued)

*Primary Examiner* — Shafiq Mian
(74) *Attorney, Agent, or Firm* — HAUPTMAN HAM, LLP

(57) ABSTRACT

A long-endurance self-powered ocean buoy includes a buoy body, a power generation device and a gas bag base; the power generation device is mounted at a lower end of the gas bag base and includes a housing, a first power generation assembly, a second power generation assembly and a storage battery; the first power generation assembly includes a plurality of mutually-communicated gas chambers, hydraulic bags and control integration units. The lowest gas cham-
(Continued)

ber is filled with a volatile working medium which can generate gas pressure by volatilization to drive power generation fans in turbines on a vent pipe communicating adjacent gas chambers for power generation. The second power generation assembly includes a plurality of temperature difference energy modules with one end surrounded by a phase change material and the other end in contact with the housing, so as to increase the power generation efficiency.

8 Claims, 3 Drawing Sheets

CPC . F05B 2240/93; F05B 2260/4031; F05B 2220/706; F05B 2240/97; F05B 2280/5001; Y02E 10/38
See application file for complete search history.

(56) References Cited

OTHER PUBLICATIONS

English Translation CN-112145384-A (Year: 2019).*
First Office Action in Corresponding Chinese Application No. 202210648599.4, dated Jan. 12, 2023; 13 pgs.
First Search Report in Corresponding Chinese Application No. 202210648599.4, dated Jan. 6, 2023; 4 pgs.
International Search Report and Written Opinion in Corresponding International Application No. PCT/CN2022/123749, mailed Feb. 22, 2023; 15 pgs.
Notification to Grant in Corresponding Chinese Application No. 202210648599.4, dated Mar. 28, 2023; 3 pgs.

* cited by examiner

LONG-ENDURANCE SELF-POWERED OCEAN BUOY

RELATED APPLICATIONS

The present application is a U.S. National Phase of International Application Number PCT/CN2022/123749 filed Oct. 8, 2022, which claims priority to Chinese Application Number 202210648599.4 filed Jun. 9, 2022.

TECHNICAL FIELD

The present disclosure relates to the technical field of ocean monitoring devices, and in particular to a long-endurance self-powered ocean buoy.

BACKGROUND

Oceans have covered about 71% of the earth surface. The oceans store a huge amount of thermal energy and mechanical energy and hence become the largest solar collector and energy storage system in the world. The development of the ocean energy, as a highly-promising "blue energy", is of profound significance for adjusting the energy structure of China and mitigating the energy pressure. The ocean energies are rich in types, huge in energy storage, clean and free from pollution. The ocean temperature difference energy is a thermal energy generated by water temperature difference between surface seawater and deep seawater of the oceans, which is an important form of ocean energy. Theoretically, energy can be extracted as long as temperature difference exists. Therefore, the power generation by temperature difference energy is an ocean energy technology with the best development prospect, which uses a thermal gradient between the surface warm seawater and the deep cold seawater for power generation. But, nowadays, the power generation by ocean temperature difference energy still has the problems of large heat exchange area, high construction costs and low efficiency (only about 3% by now) and the like.

In order to carry out research on the development and utilization technology of the ocean temperature difference energy, it is usually required to use an underwater detection device, for example, a common Argo buoy. However, all of the existing buoys use lithium batteries for power supply, increasing the costs. Furthermore, the electric energy of the lithium batteries is limited, and thus it is difficult to recover the Argo buoys when the power runs out. Therefore, most of the Argo buoys are lost in the vast sea when running out of the power. Moreover, the Argo buoys lost in the vast sea may also pose pollution to the oceans.

SUMMARY

Summary of the Present Disclosure

Technical Problem

Solution to the Technical Problem

Technical Solution

In order to solve the shortcomings in the prior arts, the present disclosure provides a long-endurance self-powered ocean buoy, which fully utilizes ocean temperature difference energy to generate power so as to increase the service time of the buoy and improve the monitoring and detection capability of the buoy.

In order to address the above technical problems, the present disclosure employs the following technical solution: there is provided a long-endurance self-powered ocean buoy, which includes a buoy body, a gas bag base and a power generation device. The gas bag base is fixedly mounted at a lower end of the buoy body. The power generation device is fixedly mounted at a lower end of the gas bag base. The power generation device includes a housing, a first power generation assembly, a second power generation assembly, and a storage battery. The first power generation assembly and the second power generation assembly are both mounted inside the housing. The storage battery is mounted at the top of an inner side of the housing and connected to a buoy power source inside the buoy body by running a line through the top of the housing and the gas bag base.

The first power generation assembly includes a first gas chamber, a second gas chamber, a third gas chamber, hydraulic bags and control integration units. The first gas chamber, the second gas chamber and the third gas chamber are all mounted sequentially from bottom up. Two adjacent gas chambers are fixed and supported by connection support columns, and are in communication with each other through a vent pipe. One or more turbines are disposed with equal distance on each vent pipe, and one or more power generation fans are mounted inside each turbine. Each of the turbines is connected to the storage battery via a line to transmit the electric energy generated by the corresponding power generation fan to the storage battery for storage. The second gas chamber and the third gas chamber are in communication with the first gas chamber through a condensing reflux pipe. The first gas chamber is filled with a fluid working medium. Two control integration units are disposed, which are respectively mounted at the center of the top of the first gas chamber and the second gas chamber through an integration fixing bracket. The control integration units are both internally provided with a switch control system, a pressure monitoring system and a wind power generation system, which are respectively connected to the turbines at the corresponding positions by a line. There disposed a plurality of hydraulic bags, which are mounted with equal distance along a circumference of the second gas chamber, where each hydraulic bag is internally provided with a gravity counterweight block.

The second power generation assembly is connected to the storage battery via a line, and includes a plurality of temperature difference energy modules, which are series-connected with each other and fixedly covered on an outer side of the third gas chamber. One end of each temperature difference energy module is surrounded by a phase change material and the other end is in contact with the housing.

Furthermore, the housing of the power generation device is shaped like cylinder and integrally made of 316L stainless steel material. A flange is disposed on the top of the housing and fixedly connected to a lower end surface of the gas bag base by bolts. A line through hole is disposed at the central position of the top of the housing.

Furthermore, the first gas chamber, the second gas chamber and the third gas chamber are all elliptical, where an inner volume of the second gas chamber is less than that of the first gas chamber and an inner volume of the third gas chamber is less than that of the second gas chamber.

Furthermore, the fluid working medium filled in the first gas chamber is strong ammonia water, and a dialysis layer is disposed inside the first gas chamber.

Furthermore, the vent pipe is a helically-rising structure and fixedly welded between gas chambers; a gas pressure valve and a pressure sensor are disposed at a gas inlet of a lower end of each vent pipe and connected to the corresponding control integration unit by a line respectively.

Furthermore, a condensing reflux switch is disposed at an entry of the condensing reflux pipe and connected to the corresponding control integration unit by a line.

Furthermore, the first gas chamber, the second gas chamber and the third gas chamber are all made of titanium-stainless steel composite plate, with a jacket made of 304 stainless steel and a heat insulation layer made of Q235B.

Furthermore, the entire power generation device is in a communicated and closed state and serves as a relatively independent unit, where the storage battery is connected with a power source inside the buoy body only by a line.

Furthermore, four hydraulic bags are disposed and the centers of mounting positions of the four hydraulic bags are in a same horizontal surface.

Furthermore, the phase change material for surrounding the temperature difference energy modules in the second power generation assembly is a solid-liquid composite phase change material.

Beneficial Effects of the Present Disclosure

Beneficial Effects

Compared with the prior arts, the present disclosure has the following beneficial effects: in the present disclosure, the power generation device generates power mainly based on phase-change-compensated dynamic ocean temperature difference energy. The power generation device is fixedly disposed on the automatic buoy such that self power generation can be achieved along with floating up and diving of the buoy. Coupled with the effect of the phase change material, the power generation efficiency can be improved so as to provide sufficient power to the buoy. Especially, the Argo buoys with lithium battery as primary power can significantly increase its endurance and extend its service life. Further, the device is easy to recover, reducing the development and use costs and ocean pollution, and hence bringing broad application prospect.

BRIEF DESCRIPTIONS OF THE DRAWINGS

Brief Descriptions of the Drawings

Descriptions of the Drawings

Figure 1:
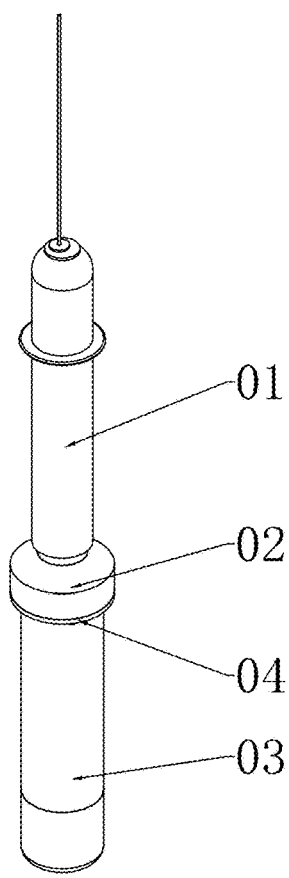
FIG. 1 is a schematic diagram of an entire structure of the present disclosure.
Figure 2:
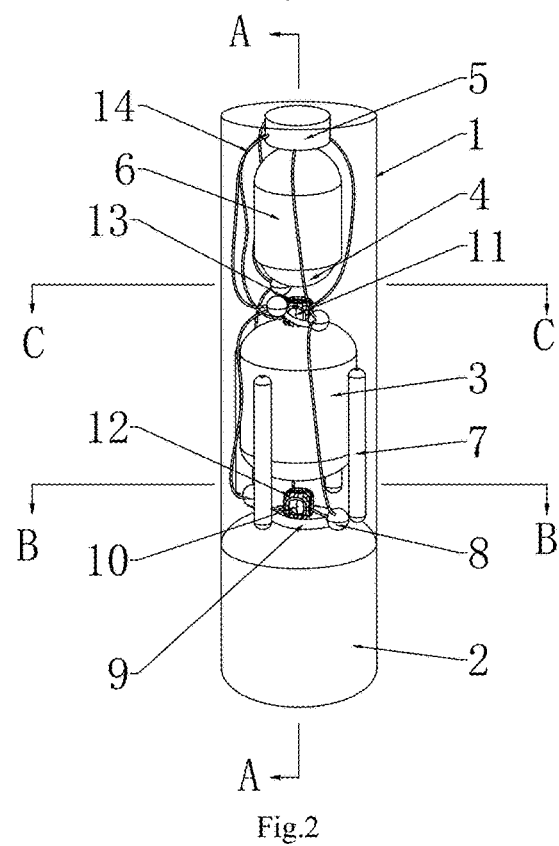
FIG. 2 is a perspective view illustrating an entire structure of a power generation device according to the present disclosure.
Figure 3:
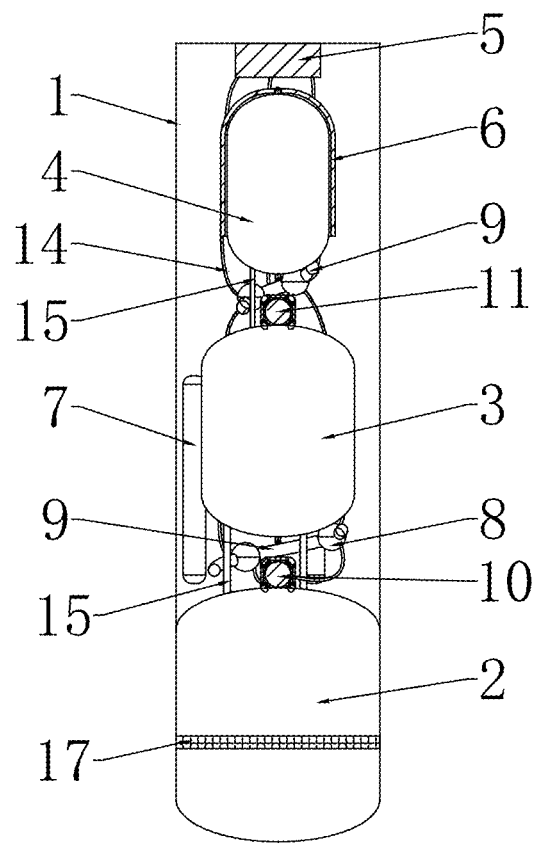
FIG. 3 is a sectional view taken along A-A in FIG. 2.
Figure 4:
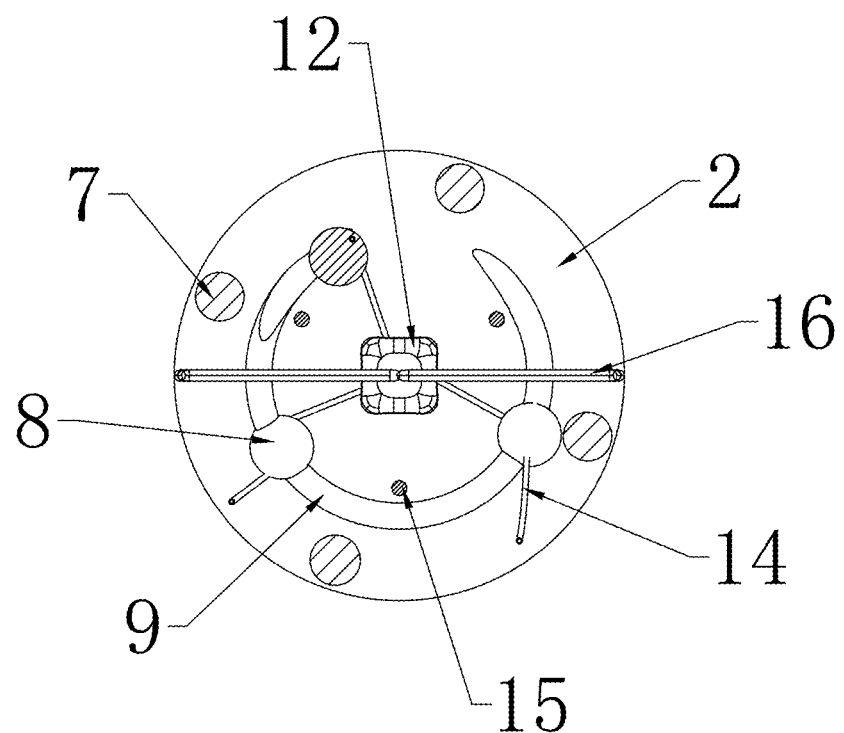
FIG. 4 is a horizontal sectional view taken along B-B in FIG. 2.

The numerals of the drawings are described below: 01. buoy body, 02. gas bag base, 03. power generation device, 04. flange, 1. housing, 2. first gas chamber, 3. second gas chamber, 4. third gas chamber, 5. storage battery, 6. second power generation assembly, 7. hydraulic bag, 8. turbine, 9. vent pipe, 10. No. 1 control integration unit, 11. No. 2 control integration unit, 12. No. 1 integration fixing bracket, 13. No. 2 integration fixing bracket, 14. electric line, 15. connection support column, 16. condensing reflux pipe, 17. dialysis layer.

DETAILED DESCRIPTIONS OF EMBODIMENTS

Embodiments of the Present Disclosure

Implementations of the Present Disclosure

It is noted that in the descriptions of the present disclosure, the orientation or positional relationship indicated by the terms such as "upper", "lower", "left", "right", "front", "rear", "top", "inner" and "outer" and the like are based on the orientation or positional relationship shown in the drawings; and the terms are relational words determined only to describe the structural relationship of the components of the present disclosure and do not specifically refer to that any component of the present disclosure must have a specific orientation or must be constructed and operated in a specific orientation. Therefore, the terms shall not be understood as limiting of the present disclosure.

Furthermore, in the present disclosure, the terms such as "first", "second", "No. 1" and "No. 2" and the like are used only for the purpose of descriptions rather than for specifically indicating any sequence or order nor for limiting the present disclosure; these terms are used only to distinguish components or operations described by the same technical terms and shall not be understood as indicating or implying any relative importance or implicitly indicating the number of the indicated technical features. Therefore, the features limited by "first" and "second" may explicitly or implicitly include at least one of the features.

In the descriptions of the present disclosure, it should be noted that unless otherwise clearly stated or defined, the terms such as "mounting", "connecting" and "coupling" should be understood in general sense, for example, may be a fixed connection, or a detachable connection or an integral connection; or a mechanical connection, or an electrical connection; or a direct connection or an indirect connection through an intermediary medium. Those skilled in the arts can understand the specific meanings of the above terms in the present disclosure based on specific situations.

The specific embodiments of the present disclosure will be further detailed below in combination with accompanying drawings.

As shown in FIG. 1, there is provided a long-endurance self-powered ocean buoy, which includes a buoy body 01, a gas bag base 02 and a power generation device 03. The gas bag base 02 is fixedly mounted at a lower end of the buoy body 01, and the power generation device 03 is fixed at a bottom end of the gas bag base 02 by a flange 04 and bolts. As shown in FIGS. 2 to 5, the power generation device 03 includes a housing 1, a first power generation assembly, a second power generation assembly 6, and a storage battery 5. The housing 1 with a hollow interior is entirely shaped like cylinder and integrally made of 316L stainless steel material. The first power generation assembly and the second power generation assembly 6 are both fixedly mounted inside the housing 1 and the storage battery 5 is fixedly mounted at the top of an inner side of the housing 1. Furthermore, a line through hole with a radius of 5 mm is disposed at the central position of the top of the housing 1, and a line of the storage battery 5 runs through the top of the housing 1 and the gas bag base 02 and connects with a buoy power source inside the buoy body 01 so as to realize continuous power supply.

The first power generation assembly includes a first gas chamber 2, a second gas chamber 3, a third gas chamber 4, four hydraulic bags 7 and two control integration units. The first gas chamber 2, the second gas chamber 3 and the third gas chamber 4 are all disposed as an elliptical structure and fixedly mounted sequentially from bottom up, with their volumes gradually diminishing. An inner volume of the second gas chamber 3 is less than that of the first gas chamber 2, and an inner volume of the third gas chamber 4 is less than that of the second gas chamber 3. Two adjacent gas chambers are fixed and supported by three vertical connection support columns 15, and are in communication with each other through a vent pipe 9. The vent pipe 9 is disposed helically to increase a gas exchange path and help increase the utilization rate of the gas fluid. Upper and lower ends of the vent pipe 9 are tangentially welded to the bottom and the top of the corresponding two adjacent gas chambers respectively. A gas pressure valve and a pressure sensor are mounted at a gas inlet of the lower end of the vent pipe 9. Three turbines 8 are mounted in series and disposed with equal distance on each vent pipe 9 and one power generation fan is fixedly mounted inside each turbine 8. Furthermore, the above second gas chamber 3 and third gas chamber 4 are in communication with the first gas chamber 2 via a condensing reflux pipe 16 respectively, and a condensing reflux switch is disposed at an entry of the condensing reflux pipe 16. A dialysis layer 17 is disposed inside the first gas chamber 2, and the first gas chamber 2 is filled with a fluid working medium. This fluid working medium is a volatile high-concentration strong ammonia water. The above two control integration units include No. 1 control integration unit 10 and No. 2 control integration unit 11, which are respectively mounted at the center of the top of the first gas chamber 2 and the second gas chamber 3 by corresponding No. 1 integration fixing bracket 12 and No. 2 integration fixing bracket 13. The control integration units are both internally provided with a switch control system, a pressure monitoring system and a wind power generation system. The No. 1 control integration unit 10 is respectively connected by an electric line 14 to the three turbines 8 located between the first gas chamber 2 and the second gas chamber 3, to the gas pressure valve and the pressure sensor on the vent pipe 9 and to the condensing reflux switch connected with the second gas chamber 3 and further carries out control on them. The No. 2 control integration unit 11 is respectively connected by an electric line 14 to the three turbines 8 located between the second gas chamber 3 and the third gas chamber 4, to the gas pressure valve and the pressure sensor on the vent pipe 9 and to the condensing reflux switch connected with the third gas chamber 4 and further carries out control on them. The four hydraulic bags 7 are fixedly mounted around the second gas chamber 3 with equal distance, where the center points of their mounting positions are all on a same horizontal surface and each hydraulic bag 7 is internally provided with a gravity counterweight block. Each of the above turbines 8 is also connected to the storage battery 5 via an electric line 14 such that the electric energy generated by the power generation fan inside it is rectified and then transmitted to the storage battery 5 for storage.

The second power generation assembly 6 is a power generation assembly capable of capturing ocean temperature difference energy based on phase change material, which includes a plurality of temperature difference energy modules which are connected in series and fixedly covered on an outer side of the third gas chamber 4, with their tops connected via a circuit to the storage battery 5. One end of each temperature difference energy module is surrounded by phase change material and the other end is in contact with an inner sidewall of the housing and changes in temperature depending on the change of the temperature of the seawater. The phase change materials are divided based on substance change into four types which are solid-liquid, solid-solid, solid-gas, and liquid-gas phase changes respectively. Since the solid-liquid phase change material can complete a phase change process under a low pressure and the phase change material is small in volume change, large in latent heat and small in temperature interval change, each temperature difference energy module is surrounded by the solid-liquid composite phase change material.

The above entire power generation device 03 is relatively independent and in a closed state with internal mutual communication and is in communication with the buoy body 01 only via a line. In order to ensure the vaporization and liquefaction of the strong ammonia water and the pressure resistance and corrosion resistance of the entire device, the first gas chamber 2, the second gas chamber 3 and the third gas chamber 4 are all made of titanium-stainless steel composite plate, with a jacket made of 304 stainless steel and a heat insulation layer made of Q235B.

The above power generation device 03 is based on the following working principle: since there exists a phenomenon that the temperature difference between different water layers of ocean water bodies (South China Sea) is large and the temperature of the surface seawater is much higher than that of the deep seawater (at the underwater depth of 2000 meters, the water temperature is about 3° C.; and the water temperature of the water surface is about 28° C.), the power generation is carried out based on the vertical temperature difference of the ocean. When the buoy is placed into the ocean and moves up from the underwater depth of 2000 meters, the seawater temperature will increase slowly. Due to the heat transfer of the specially-made housing 1 and the exposure at the lower end of the housing 1, the increase of the seawater temperature as a heat source causes the temperature in the first gas chamber 2 to increase gradually. When the temperature reaches the critical point of the vaporization of the strong ammonia water, the ammonia gas separates from the strong ammonia water in large volume so as to generate a high pressure gas mass. The gas pressure in the first gas chamber 2 increases and the pressure sensor monitors in real time the pressure in the first gas chamber 2 and transmits data information to the No. 1 control integration unit 10. The pressure monitoring system in the No. 1 control integration unit 10 compares the real-time pressure value with a preset value. When the real-time pressure in the first gas chamber 2 reaches the preset value, the switch control system controls the gas pressure valve at the gas inlet of the vent pipe 9 to open to communicate the first gas chamber 2 with the second gas chamber 3, and the gas surges from the first gas chamber 2 through the vent pipe 9 into the second gas chamber 3 while running through the turbines 8 on the vent pipe 9 during the flow process. Due to the Venturi effect, the power generation fans mounted in the turbines are blown sideways and the gas flow drives the rotation of the power generation fans (at this time, the gas flow impacts on one blade of the power generation fans so that the gas flow rate brings the power generation fans to a maximum rotation speed) so as to carry out stable magnetic power generation. The wind power generation system in the No. 1 control integration unit 10 controls the power generation fans and transmits the electric current generated by the power generation fans via the electric line 14 to the storage battery 5. As the entire buoy continues floating up, the seawater temperature gradually increases and the strong ammonia water vaporizes at a faster rate and in this case, the gas pressures in the first gas chamber 2 and the second gas chamber 3 gradually increase. When the pressure sensor between the second gas chamber 3 and the third gas chamber 4 detects the pressure in the second gas chamber 3 reaches the preset value, the switch control system in the No. 2 control integration unit 11 controls the gas pressure valve at the gas inlet of the vent pipe to open to communicate the second gas chamber 3 with the third gas chamber 4, and the gas surges from the second gas chamber 3 through the vent pipe 9 into the third gas chamber 4. Based on the above principle, the gas flow drives the power generation fans in the turbines 8 between the second gas chamber 3 and the third gas chamber 4 to carry out secondary power generation (at this time, the gas flow rate also can bring the power generation fans to the maximum rotation speed). The No. 2 control integration unit 11 controls the generated electric current to be rectified and then transmitted via the electric line 14 to the storage battery 5 for storage.

The preset pressure values for triggering the gas pressure valve to turn on and off in the pressure monitoring systems of the above two control integration units are different and can be set initially based on specific data.

Figure 5:
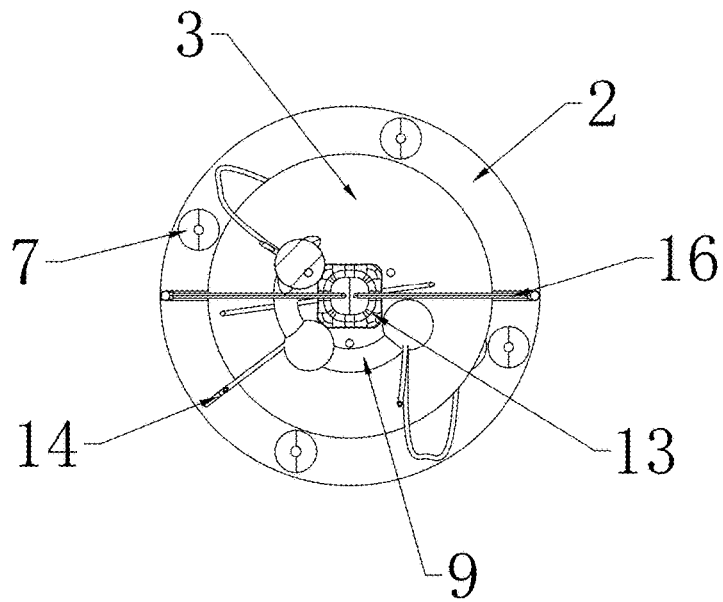
FIG. 5 is a horizontal sectional view taken along C-C in FIG. 2.
Figure 6:
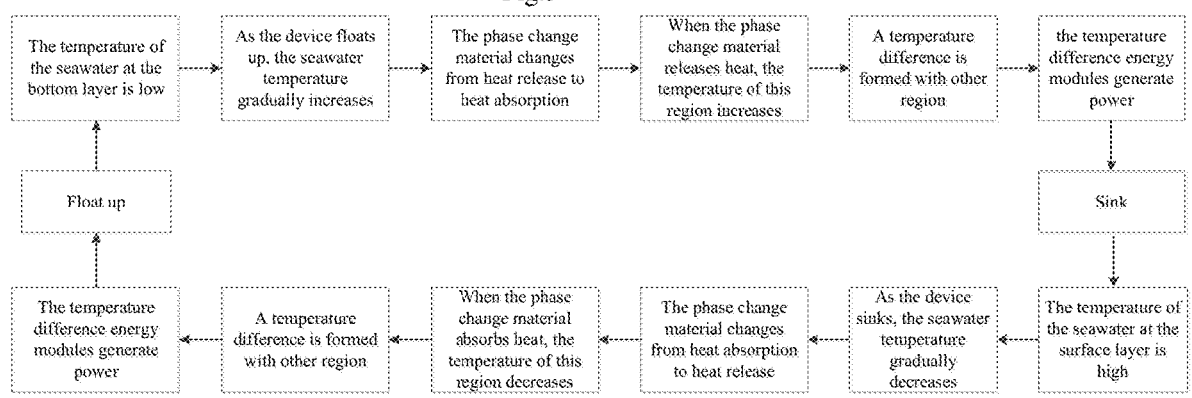
FIG. 6 is a principle diagram illustrating a power generation process of a second power generation assembly according to the present disclosure.

When the entire buoy floats up, its second power generation assembly 6 can also generate electric energy by using the phase change material as shown in FIG. 5. Along with the float-up of the buoy and the increase of the seawater temperature, the phase change material absorbs heat during the conversion process and the region of a side of the temperature difference energy modules surrounded by the phase change material has a reduced temperature (it is a relative concept, namely, the temperature of the part surrounded by the phase change material is relatively constant whereas the temperature of the part not surrounded by the phase change material changes along with the seawater temperature), such that a temperature difference is formed between the region of the side surrounded by the phase change material and the region of the side not surrounded by the phase change material. At present, the semiconductor temperature difference energy module for power generation can correspondingly generate 0.03V voltage for the temperature difference of each 1° C. Thus, in the South China Sea, a considerably huge amount of electric energy can be generated due to the temperature difference of up to 25° C. The electric current generated based on the temperature difference by using the phase change material and the electric current generated by the first power generation assembly as above are collected together to go through tuning, voltage transformation and integration to form a stable electric current which is then introduced into the storage battery 5 for storage.

When the above buoy reaches the ocean surface, the hydraulic bags 7 in the first power generation assembly shrink based on a preset instruction of the sensor and the gravity counterweight blocks inside them move downward to increase the weight of the entire power generation device 03. The above buoy sinks under the action of its deadweight. During the sinking process, the control integration units control all gas pressure valves to close and open the corresponding condensing reflux switches, and the separating ammonia gas enters the condensing reflux pipe 16. Along with the dive of the device, the seawater temperature decreases, and heat exchange can be completed by the heat transfer of the housing 1. When the buoy reaches a deep layer of seawater, the low seawater temperature cools down the ammonia gas in the condensing reflux pipe 16 and changes it back into liquid and injects it into the first gas chamber 2. At the same time, the phase change material in the second power generation assembly 6 changes from heat absorption to heat release and the region of the side of the temperature difference energy modules surrounded by the phase change material has an increased temperature such that a temperature difference is formed between the region of the side surrounded by the phase change material and the region of the side not surrounded by the phase change material. In this case, electric current is generated and then goes through tuning, voltage transformation and integration to form a stable electric current which is then introduced into the storage battery 5 for storage.

When the entire buoy reaches the deep seawater at the underwater depth of 2000 meters, the four hydraulic bags 7 in the first power generation assembly increase in volume to increase the contact with the seawater and hence generate a buoyancy such that the entire buoy (the power generation device 03 makes its underwater density approximate to that the seawater by calculation) moves up under the action of the buoyancy. As the buoy moves upward again, the fluid working medium is vaporized again to repeat the above power generation process. The phase change material also generates power by temperature difference. Thus, the electric currents generated by the above two manners are collected together and then stored. Therefore, the fluid working medium goes through a series of processes such as vaporization and evaporation, expansion pressurization, impact power generation and condensation recovery in a closed circuit. These processes consume less energy and run more slowly in this closed state, which ensures the reaction runs continuously and the endurance and service life of the buoy can be extended. Further, the buoy will not sink into the deep sea after running out of power but can float up with sufficient power to facilitate its recovery, reducing the pollution of the ocean garbage.

Finally, it should be noted that the above embodiments are used only to describe the technical solutions of the present disclosure rather than to limit the present disclosure. Further, the present disclosure is also limited to the above examples. Any changes, modifications, additions or replacements made by those skilled in the arts within the essence scope of the present disclosure shall all fall within the scope of protection of the present disclosure.

The invention claimed is:

1. A long-endurance self-powered ocean buoy, comprising:
 a buoy body;
 a power generation device and a gas bag base,
 wherein the gas bag base is fixedly mounted at a lower end of the buoy body, the power generation device is fixedly mounted at a lower end of the gas bag base, and the power generation device comprises a housing, a first power generation assembly, a second power generation assembly, and a storage battery,
 wherein the first power generation assembly and the second power generation assembly are both mounted inside the housing, and the storage battery is mounted at a top of an inner side of the housing and connected to a buoy power source inside the buoy body by running a line through the top of the inner side of the housing and the gas bag base, wherein the first power generation assembly comprises a first gas chamber, a second gas chamber, a third gas chamber, hydraulic bags and control integration units, wherein the first gas chamber, the second gas chamber and the third gas chamber are mounted sequentially from bottom up, an inner volume of the second gas chamber is less than an inner volume of the first gas chamber, and an inner volume of the third gas chamber is less than the inner volume of the second gas chamber, wherein two adjacent gas chambers are fixed and supported by connection support columns, and are in communication with each other through at least one vent pipe, and wherein the at least one vent pipe is a helically-rising structure which is fixedly welded between the first, the second and the third gas chambers, wherein a gas pressure valve and a pressure sensor are disposed at a gas inlet of a lower end of each vent pipe of the at least one vent pipe, and connected to a corresponding control integration unit by a line respectively, wherein one or more turbines are disposed at equal distance on each vent pipe of the at least one vent pipe, one or more power generation fans are mounted inside each of the one or more turbines, and each of the one or more turbines is connected to the storage battery via a line to transmit electric energy generated by a corresponding power generation fan to the storage battery for storage, wherein the second gas chamber and the third gas chamber are in communication with the first gas chamber through a condensing reflux pipe, and the first gas chamber is filled with a fluid working medium, and two control integration units are disposed, which are respectively mounted at a center of a top of the first gas chamber and the second gas chamber through an integration fixing bracket, wherein the control integration units are both internally provided with a switch control system, a pressure monitoring system and a wind power generation system which are respectively connected to the turbines at the corresponding positions by a line, wherein at least four hydraulic bags are mounted at equal distance along a circumference of the second gas chamber, and each of the at least four hydraulic bags is internally provided with a gravity counterweight block, and centers of mounting positions of each of the at least four hydraulic bags are in a same horizontal surface, wherein when the long-endurance self-powered ocean buoy reaches the ocean surface, each of the at least four hydraulic bags in the first power generation assembly shrinks based on a preset instruction of the sensor, and the gravity counterweight block inside each of the at least four hydraulic bags moves downward to increase the weight of an entirety of the power generation device, wherein the long-endurance self-powered ocean buoy sinks under an action of a deadweight of the long-endurance self-powered ocean buoy, wherein when an entirety of the long-endurance self-powered ocean buoy reaches a seawater at an underwater depth of 2000 meters, and the each of the at least four hydraulic bags in the first power generation assembly increases in volume to increase the contact with the seawater and hence generate a buoyancy such that the entirety of the long-endurance self-powered ocean buoy moves up under an action of the buoyancy, wherein the second power generation assembly is connected to the storage battery via a line, and comprises a plurality of temperature difference energy modules, which are connected in series with each other and fixedly covered on an outer side of the third gas chamber, and wherein one end of each temperature difference energy module is surrounded by a phase change material, and an other end is in contact with the housing.

2. The long-endurance self-powered ocean buoy of claim 1, wherein the housing of the power generation device is cylindrical and made integrally of 316L stainless steel material, and a flange is disposed on a top of the housing and fixedly connected to a lower end surface of the gas bag base by bolts, and a line through hole is disposed at a central position of the top of the housing.

3. The long-endurance self-powered ocean buoy of claim 1, wherein the first gas chamber, the second gas chamber and the third gas chamber are all elliptical.

4. The long-endurance self-powered ocean buoy of claim 1, wherein the fluid working medium filled in the first gas chamber is strong ammonia water, and a dialysis layer is disposed inside the first gas chamber.

5. The long-endurance self-powered ocean buoy of claim 1, wherein a condensing reflux switch is disposed at an entry of the condensing reflux pipe and connected to a corresponding control integration unit by a line.

6. The long-endurance self-powered ocean buoy of claim 1, wherein the first gas chamber, the second gas chamber and the third gas chamber are all made of titanium-stainless steel composite plate, with a jacket made of 304 stainless steel and a heat insulation layer made of Q235B.

7. The long-endurance self-powered ocean buoy of claim 1, wherein an entirety of the power generation device is in a communicated and closed state and serves as an independent unit, and wherein the storage battery is connected with a power source inside the buoy body only by a line.

8. The long-endurance self-powered ocean buoy of claim 1, wherein the phase change material for surrounding the temperature difference energy modules in the second power generation assembly is a solid-liquid composite phase change material.

* * * * *